US008791917B2

United States Patent
Juan et al.

(10) Patent No.: US 8,791,917 B2
(45) Date of Patent: Jul. 29, 2014

(54) TOUCH DISPLAY DEVICES AND FORMATION METHODS THEREOF

(75) Inventors: Yi-Chung Juan, Tainan (TW);
Kuo-Sheng Lee, Tainan (TW);
Chang-Ching Yeh, Kaohsiung (TW);
Chien-Ting Chan, Tainan (TW);
Sung-Chun Lin, Tainan (TW)

(73) Assignee: Hannstar Display Corp., New Taipei (TW)

( * ) Notice: Subject to any disclaimer, the term of this patent is extended or adjusted under 35 U.S.C. 154(b) by 207 days.

(21) Appl. No.: 13/435,585

(22) Filed: Mar. 30, 2012

(65) Prior Publication Data
US 2013/0082944 A1 Apr. 4, 2013

(30) Foreign Application Priority Data
Sep. 30, 2011 (TW) .............................. 100135463 A (51) Int. Cl.
*G06F 3/041* (2006.01)
(52) U.S. Cl.
USPC .......................................... 345/173; 345/174
(58) Field of Classification Search
CPC .................................................. G06F 3/04111
USPC ............................................................ 345/173
See application file for complete search history.

(56) References Cited

U.S. PATENT DOCUMENTS

| | | | | |
|---|---|---|---|---|
| 2008/0264699 A1* | 10/2008 | Chang et al. | ............... | 178/18.01 |
| 2008/0309635 A1* | 12/2008 | Matsuo | ......................... | 345/173 |
| 2009/0085885 A1* | 4/2009 | Wu et al. | ........................ | 345/173 |
| 2009/0213090 A1* | 8/2009 | Mamba et al. | ................ | 345/174 |
| 2010/0171718 A1* | 7/2010 | Denda | ............................ | 345/173 |
| 2010/0320464 A1* | 12/2010 | Chang et al. | .................... | 257/57 |
| 2011/0134055 A1* | 6/2011 | Jung et al. | .................... | 345/173 |
| 2011/0193801 A1* | 8/2011 | Jung et al. | .................... | 345/173 |
| 2012/0139871 A1* | 6/2012 | Ku et al. | ........................ | 345/174 |

* cited by examiner

*Primary Examiner* — Dorothy Harris
(74) *Attorney, Agent, or Firm* — Muncy, Geissler, Olds & Lowe, P.C.

(57) ABSTRACT

A touch display device and a formation method thereof are provided. The touch display device includes a touch panel disposed on a first surface of a substrate of a display panel. A color filter layer is disposed on a second surface of the substrate. The touch panel includes a plurality of first and second conductive patterns arranged by two directions that are perpendicular to each other. A patterned isolation layer, having a first portion and a second portion, is formed over the first surface of the substrate, wherein the first portion is disposed at the intersection of the first and the second conductive patterns, and the second portion is disposed between the first and the second conductive patterns. The first portion has a height that is lower than a height of the second portion.

19 Claims, 13 Drawing Sheets

TOUCH DISPLAY DEVICES AND FORMATION METHODS THEREOF

CROSS REFERENCE TO RELATED APPLICATIONS

This Application claims priority of Taiwan Patent Application No. 100135463, filed on Sep. 30, 2011, the entirety of which is incorporated by reference herein.

BACKGROUND OF THE INVENTION

1. Field of the Invention

The present invention relates to a touch display device, and in particular relates to reduced scratches during a dual-side process of a capacitive touch display device.

2. Description of the Related Art

Currently, there are two types of capacitive touch panels. One type of capacitive touch panel is an add-on touch panel, wherein the capacitive touch panel is disposed on the outside of a display panel. The add-on touch panel is formed from two glass substrates. One glass substrate is used for forming capacitive touch sensors thereon. Another glass substrate is used as a cover lens for protecting the capacitive touch sensors. Thus, a total thickness of a touch display device is increased due to the add-on touch panel.

Another type of capacitive touch panel is an on-color filter (CF) type touch panel. The on-CF typed touch panel has capacitive touch sensors formed on a backside of a color filter substrate of a display panel and then a glass substrate is used as a cover lens for protecting the capacitive touch sensor. Although one glass substrate is omitted in the on-CF type touch panel, the formed capacitive touch sensors on the backside of the color filter substrate are easy scratched in subsequent processes by a dual-side process of the color filter substrate.

Therefore, a touch panel which can overcome the above problems, by reducing a total thickness of a touch display device and reducing scratches of the capacitive touch sensors during the dual-side process of the color filter substrate at the same time is desired.

BRIEF SUMMARY OF THE INVENTION

According to an illustrative embodiment, a touch display device is provided. The touch display device comprises a display panel including a first substrate, having a first surface and an opposite second surface, and a color filter layer disposed on the second surface of the first substrate. The touch display device further comprises a touch panel disposed on the first surface of the first substrate. The touch panel comprises a plurality of first conductive patterns arranged along a first direction and disposed on the first surface of the first substrate. A plurality of second conductive patterns is arranged along a second direction perpendicular to the first direction and disposed on the first surface of the first substrate. A patterned isolation layer has a first portion and a second portion, wherein the first portion is disposed at an intersection of the first conductive patterns and the second conductive patterns, the second portion is disposed between the first conductive patterns and the second conductive patterns, and the first portion has a height that is lower than a height of the second portion.

According to an illustrative embodiment, a method of forming a touch display device is provided. The method comprises providing a first substrate, having a first surface and an opposite second surface, and forming a touch panel on the first surface of the first substrate. The steps of forming the touch panel comprise forming a plurality of first conductive patterns on the first surface of the first substrate, arranged along a first direction. A plurality of second conductive patterns is formed on the first surface of the first substrate, arranged along a second direction perpendicular to the first direction. An isolation layer is coated over the first surface of the first substrate. Then, a half-tone mask is provided for performing an exposure and a development process to the isolation layer to form a patterned isolation layer, wherein the patterned isolation layer includes a first portion and a second portion, the first portion is formed at an intersection of the first conductive patterns and the second conductive patterns, the second portion is formed between the first conductive patterns and the second conductive patterns, and the first portion has a height that is lower than a height of the second portion.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In embodiments of the invention, projective type capacitive touch display devices are provided. The touch display device includes a capacitive touch panel firstly formed on a backside of an upper substrate of a display panel. A color filter layer or other element is formed on a front side of the upper substrate of the display panel and then the fabrication of the display panel is completed. In the embodiments of the invention, a structure design of a capacitive touch panel is used in the touch display devices to prevent the touch panel from scratching during a dual-side process of the upper substrate of the display panel. According to the embodiments, one glass substrate is omitted from the touch display device and a total thickness of the touch display device is decreased. Moreover, the fabrication yield of the touch display device is improved.

Figure 8:
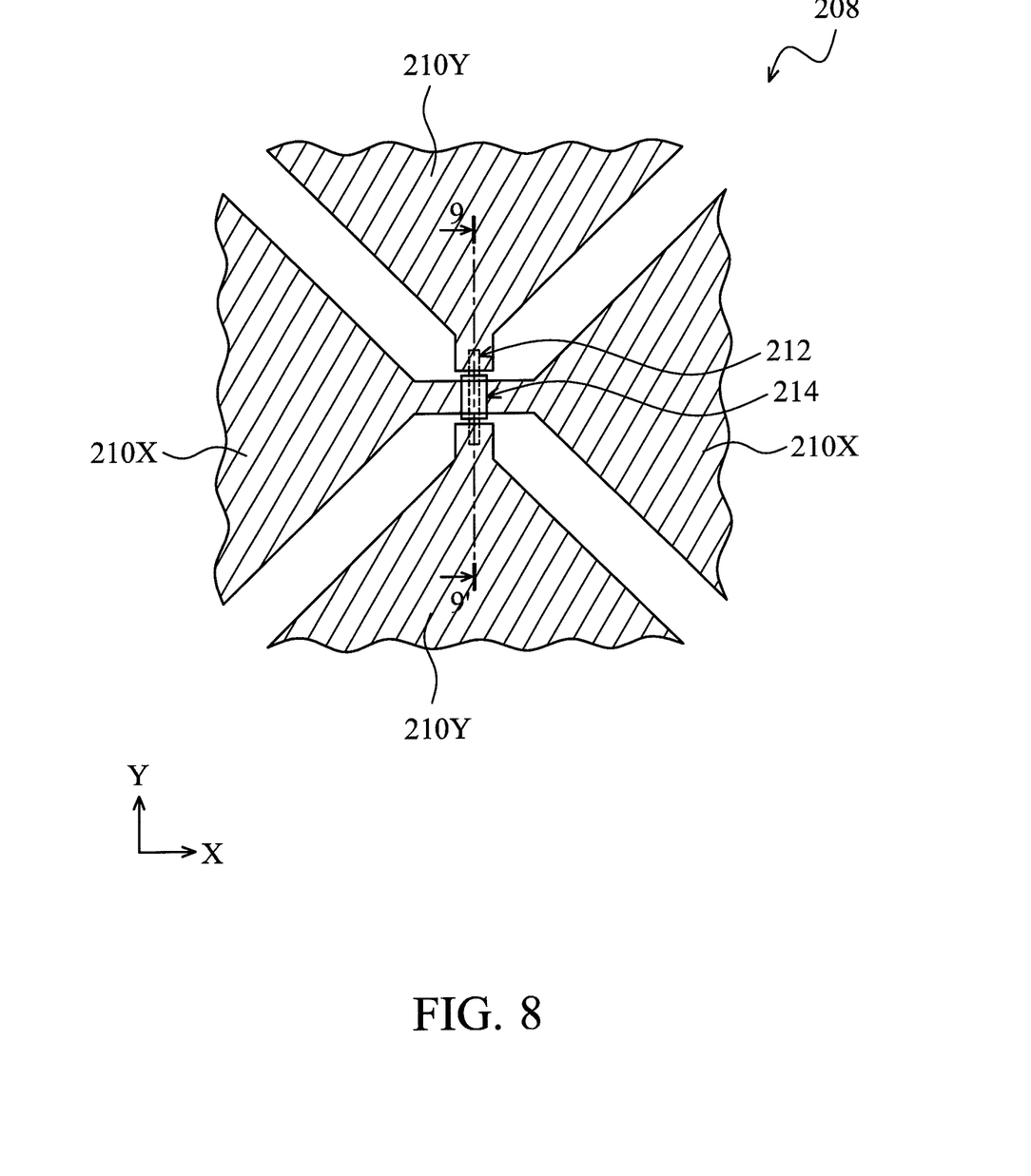
FIG. 8 shows an illustrative top view of a portion of a capacitive touch panel known by the inventors.
Figure 9:
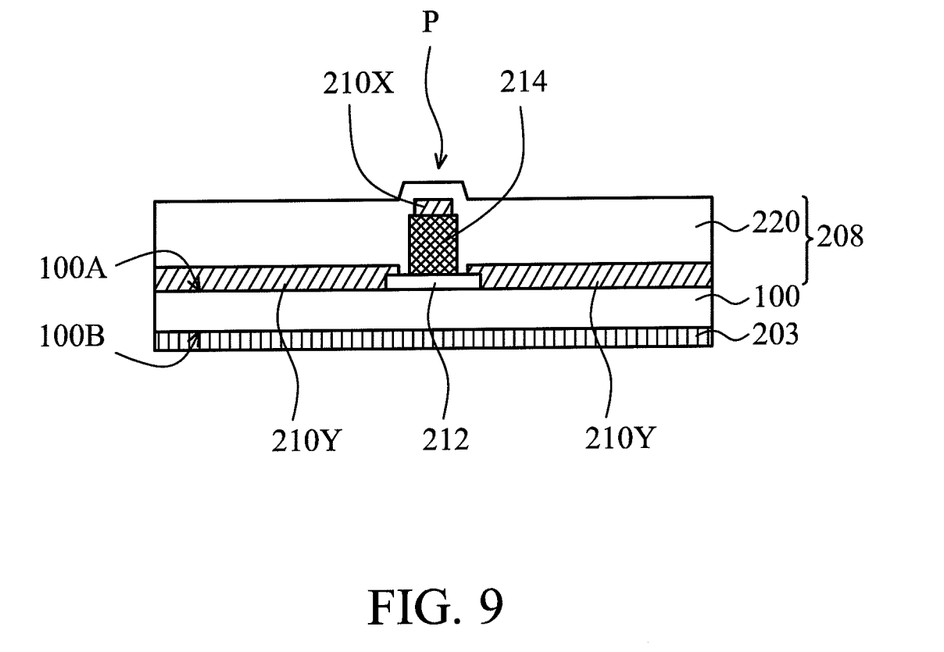
FIG. 9 shows an illustrative cross section of a capacitive touch panel along the cross section line 9-9' of FIG. 8.

Firstly, referring to FIGS. 8 and 9, FIG. 8 shows a top view of a portion of a capacitive touch panel 208 which is known by the inventors. The capacitive touch panel 208 has a plurality of sensing electrodes 210X arranged along an X direction and a plurality of sensing electrodes 210Y arranged along a Y direction. In which, the sensing electrodes 210X are directly connected with each other and the sensing electrodes 210Y are electrically connected by a metal bridge structure 212. In order to prevent a short from occurring at the intersection of the sensing electrodes 210X and the sensing electrodes 210Y, an isolation structure 214 is disposed between the metal bridge structure 212 and a connective part of the sensing electrodes 210X.

FIG. 9 shows a cross section of the capacitive touch panel 208 along the cross section line 9-9' of FIG. 8. The touch panel 208 is formed on a surface 100A of a substrate 100. The isolation structure 214 is disposed between the metal bridge structure 212 and the connective part of the sensing electrodes 210X. Therefore, after a protective layer 220 is formed to cover the sensing electrodes 210X and the sensing electrodes 210Y, the touch panel 208 has a height at the location of the isolation structure 214 that is higher than the heights at other positions. Thus, when a color filter layer 203 is formed on another surface 100B of the substrate 100, a protrusive portion P of the touch panel 208 is easily scratched or damaged which causes the touch panel 208 to malfunction.

Accordingly, in the embodiment of the invention, an improved structure design of the touch panel of the projective type capacitive touch display device is provided to reduce scratches on the touch panel during the dual-side process of the upper substrate of the display panel.

Figure 1:
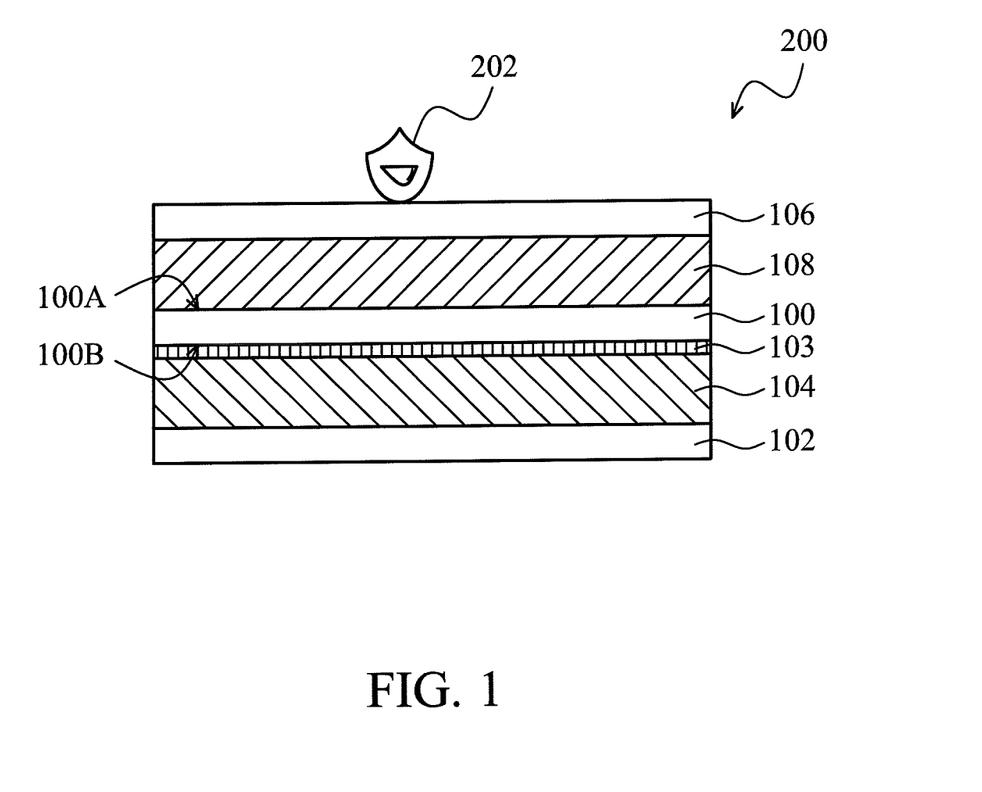
FIG. 1 shows an illustrative cross section of a touch display device according to an embodiment of the invention.

Referring to FIG. 1, a cross section of a touch display device 200 according to an embodiment of the invention is shown. The touch display device 200 includes a touch panel 108 disposed on a surface 100A of an upper substrate 100 of a display panel. A color filter layer 103 or other element layer is formed on another surface 100B of the upper substrate 100. The display panel further includes a lower substrate 102 disposed opposite to the upper substrate 100. Further, a display element 104 is sandwiched between the upper substrate 100 and the lower substrate 102. Moreover, a cover lens 106, for example a glass substrate or a plastic substrate, may be disposed on the outside of the touch panel 108 to prevent the fingers of a user or a touch pen 202 to scratch the touch panel 108.

Figure 2:
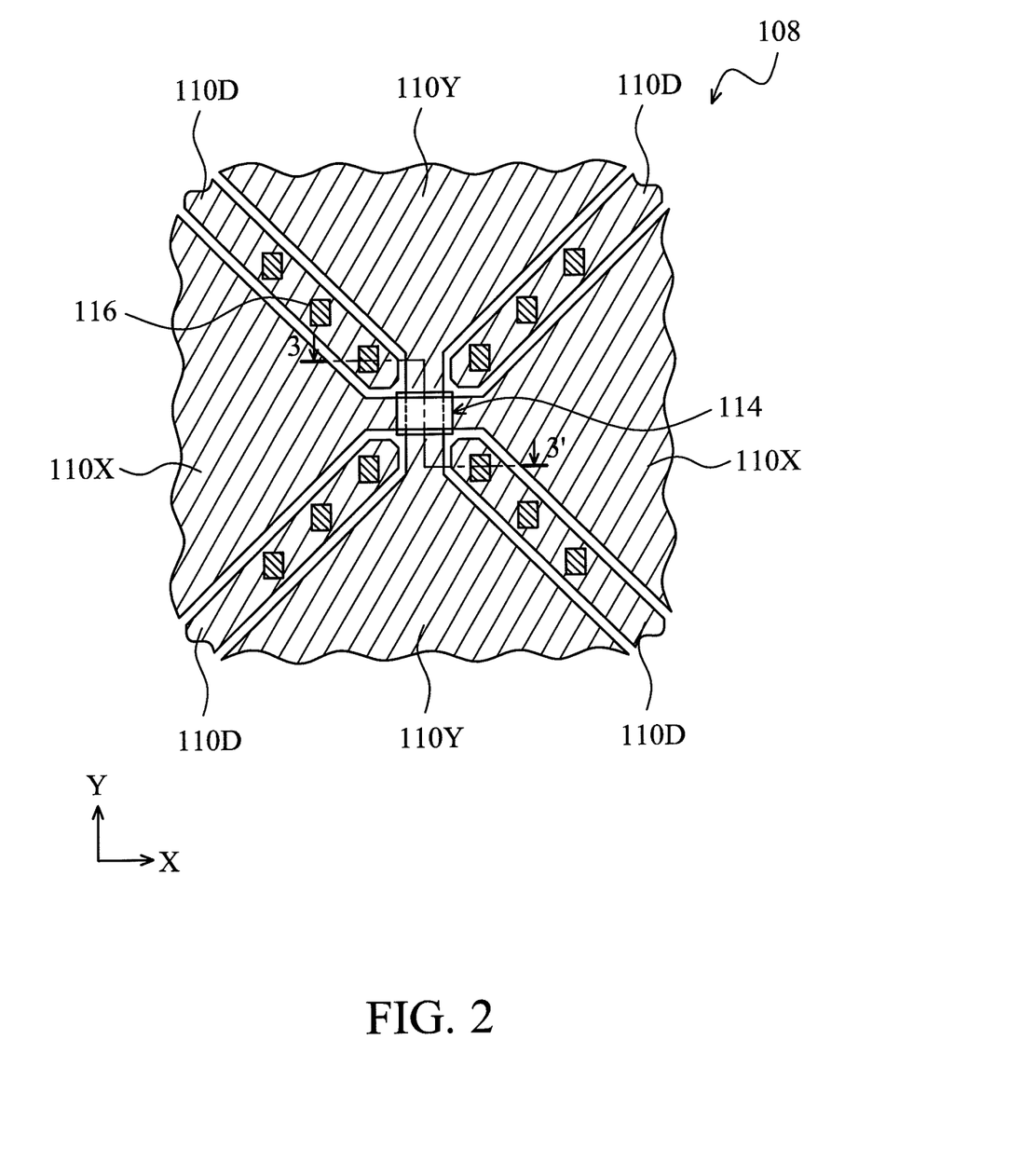
FIG. 2 shows an illustrative top view of a portion of a touch panel according to an embodiment of the invention.

FIG. 2 shows a top view of a portion of the touch panel 108 according to an embodiment of the invention. The touch panel 108 includes a plurality of conductive patterns 110X arranged along an X direction and a plurality of conductive patterns 110Y arranged along a Y direction for use as sensing electrodes. The conductive patterns 110X are connected with each other to form a row and the conductive patterns 110Y are also connected with each other to form a column. An isolation structure 114 is disposed at the intersection of the conductive patterns 110X and the conductive patterns 110Y. The isolation structure 114 is also disposed between the conductive patterns 110X and the conductive patterns 110Y to prevent a short from occurring at the intersection of the conductive patterns 110X and the conductive patterns 110Y. The materials of the conductive patterns 110X and the conductive patterns 110Y are transparent conductive materials, for example indium tin oxide (ITO). The shapes of the conductive patterns 110X and the conductive patterns 110Y may be a rhombus or other shapes.

According to an embodiment of the invention, a dummy transparent conductive pattern 110D is disposed between the conductive pattern 110X and the conductive pattern 110Y. The material of the dummy transparent conductive pattern 110D is for example indium tin oxide (ITO). The dummy transparent conductive pattern 110D, the conductive pattern 110X and the conductive pattern 110Y are electrically isolated from each other. Moreover, a dummy isolation structure 116 is disposed between the conductive patterns 110X and the conductive patterns 110Y. The dummy isolation structure 116 may be disposed under or over the dummy transparent conductive pattern 110D. The dummy isolation structure 116 has a height that is higher than a height of the isolation structure 114, such that a portion of the conductive pattern 110X over the isolation structure 114 is not scratched. In an embodiment, the materials of the isolation structure 114 and the dummy isolation structure 116 are insulating photosensitive materials, for example a photo resist. The shapes of the isolation structure 114 and the dummy isolation structure 116 may be an island, and a size of the isolation structure 114 is slightly larger than the size of the dummy isolation structure 116.

Figure 3A:
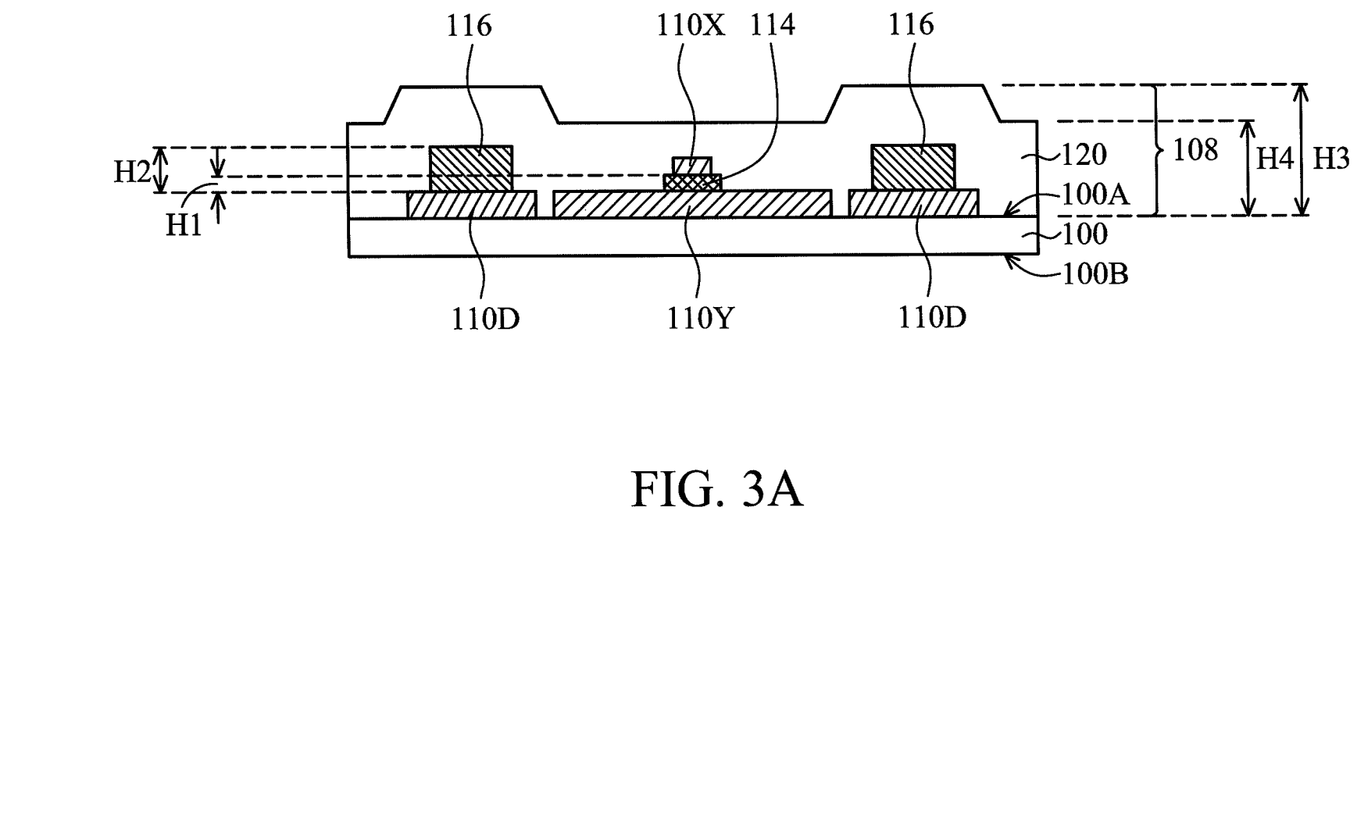
FIG. 3A shows an illustrative cross section of a touch panel along the cross section line 3-3' of FIG. 2 according to an embodiment of the invention.

FIG. 3A shows a cross section of the touch panel 108 along the cross section line 3-3' of FIG. 2 according to an embodiment of the invention. As shown in FIG. 3A, the conductive patterns 110X, the conductive patterns 110Y and the dummy transparent conductive patterns 110D are disposed on the surface 100A of the substrate 100. The isolation structure 114 is disposed at the intersection of the conductive patterns 110X and the conductive patterns 110Y for electrically isolating a connection portion of the conductive patterns 110X from a connection portion of the conductive patterns 110Y. The dummy isolation structure 116 is disposed over the dummy transparent conductive patterns 110D. A height H1 of the isolation structure 114 is lower than a height H2 of the dummy isolation structure 116. In an embodiment, the height H1 is below about 50% that of the height H2.

The surface 100A of the substrate 100 is completely covered with a protective layer 120. The material of the protective layer 120 is for example acrylic resin, silicon nitride, silicon oxide or silicon oxynitride. As shown in FIG. 3A, a height H3 of a portion of the protective layer 120 over the dummy isolation structure 116 is higher than a height H4 of a portion of the protective layer 120 over the isolation structure 114. In an embodiment, a difference between the height H3 and the height H4 is about 200 nm. Therefore, scratches occurring at the intersection of the conductive patterns 110X and the conductive patterns 110Y are effectively reduced by the structure design of the touch panel 108 of the embodiment.

Figure 3B:
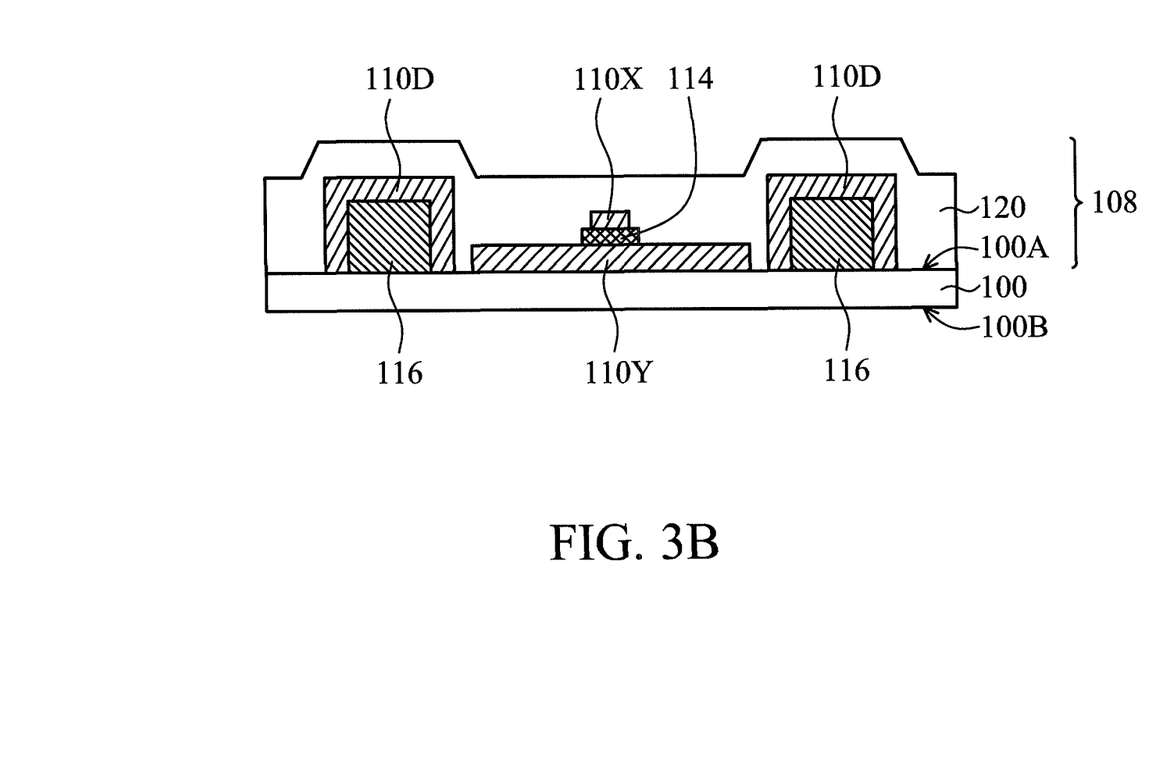
FIG. 3B shows an illustrative cross section of a touch panel along the cross section line 3-3' of FIG. 2 according to another embodiment of the invention.

FIG. 3B shows a cross section of the touch panel 108 along the cross section line 3-3' of FIG. 2 according to another embodiment of the invention. The difference between the touch panel 108 of FIG. 3B and the touch panel 108 of FIG. 3A is the dummy isolation structure 116 directly disposed on the surface 100A of the substrate 100 and the dummy transparent conductive patterns 110D disposed over the dummy isolation structure 116. Similarly, a height of the isolation structure 114 is lower than a height of the dummy isolation structure 116. Moreover, a height of a portion of the protective layer 120 over the dummy isolation structure 116 is higher than a height of a portion of the protective layer 120 over the isolation structure 114. Therefore, scratches occurring at the intersection of the conductive patterns 110X and the conductive patterns 110Y are also effectively reduced by the structure design of the touch panel 108 of FIG. 3B.

In another embodiment, no dummy transparent conductive pattern 110D is disposed between the conductive patterns 110X and the conductive patterns 110Y. Only the dummy isolation structure 116 is formed on the surface 100A of the substrate 100 and between the conductive patterns 110X and the conductive patterns 110Y.

Figure 4:
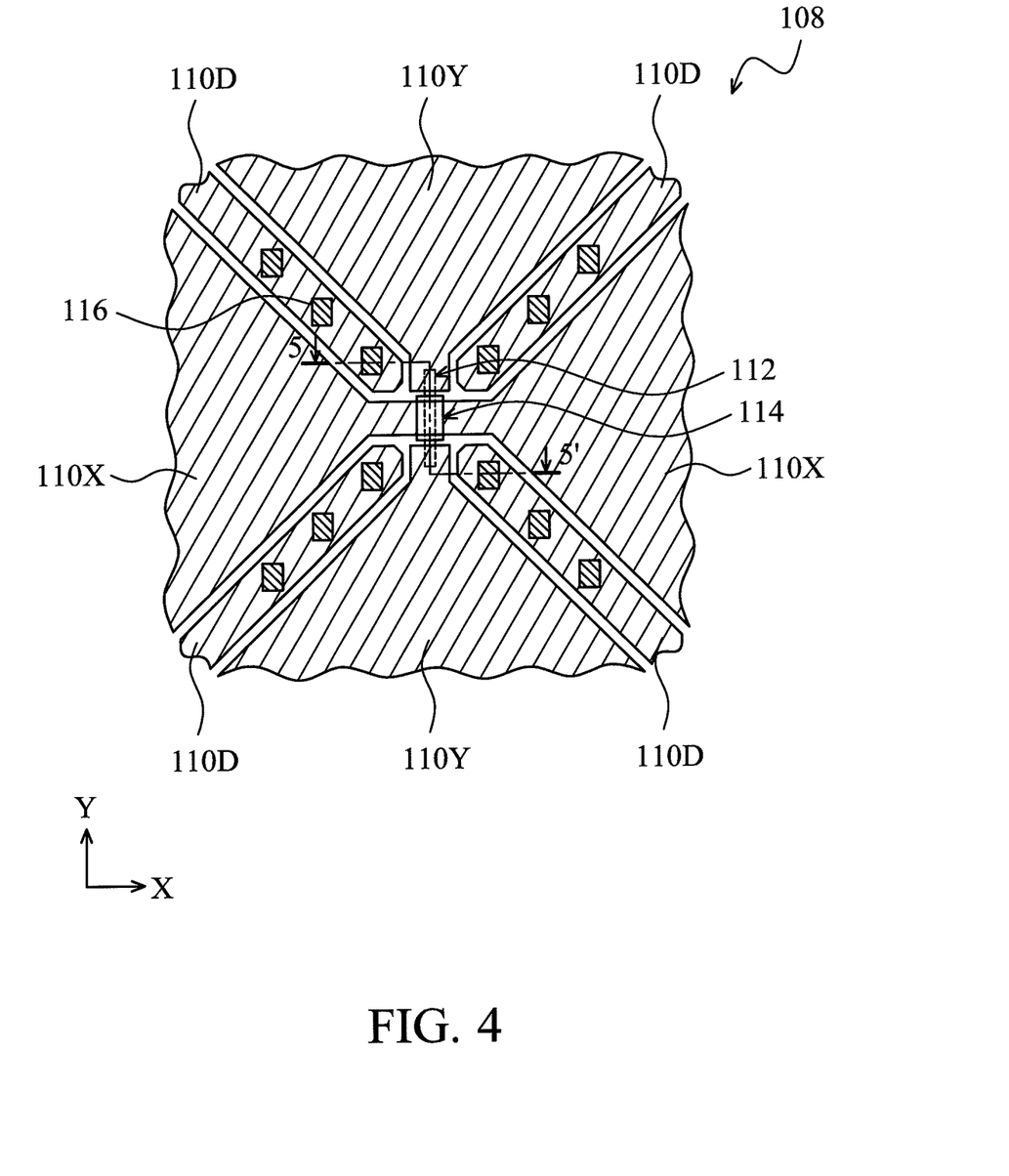
FIG. 4 shows an illustrative top view of a portion of a touch panel according to another embodiment of the invention.

FIG. 4 shows a top view of a portion of a touch panel 108 according to an embodiment of the invention. The touch panel 108 includes a plurality of conductive patterns 110X arranged along an X direction for use as sensing electrodes. The conductive patterns 110X are directly connected with each other to form a row. The touch panel 108 further includes a plurality of conductive patterns 110Y arranged along a Y direction for use as sensing electrodes. The conductive patterns 110Y are separated from each other and electrically connected with each other by a bridge structure 112 to form a column. Moreover, an isolation structure 114 is disposed between the bridge structure 112 and a connection portion of the conductive patterns 110X to prevent a short from occurring at the intersection of the conductive patterns 110X and the conductive patterns 110Y. The materials of the conductive patterns 110X and the conductive patterns 110Y are transparent conductive materials, for example indium tin oxide (ITO). The shapes of the conductive patterns 110X and the conductive patterns 110Y may be a rhombus or other shapes. The material of the bridge structure 112 may be a transparent conductive material or a metal material. The transparent conductive material is for example indium tin oxide (ITO).

According to an embodiment of the invention, a dummy transparent conductive pattern 110D is disposed between the conductive pattern 110X and the conductive pattern 110Y. The material of the dummy transparent conductive pattern 110D is for example indium tin oxide (ITO). The dummy transparent conductive pattern 110D, the conductive pattern 110X and the conductive pattern 110Y are electrically isolated from each other. Moreover, a dummy isolation structure 116 is disposed between the conductive patterns 110X and the conductive patterns 110Y. The dummy isolation structure 116 can be disposed under or over the dummy transparent conductive pattern 110D. The dummy isolation structure 116 has a height that is higher than a height of the isolation structure 114 over the bridge structure 112, such that it can effectively prevent scratches from occurring at the location of the bridge structure 112. In an embodiment, the materials of the isolation structure 114 and the dummy isolation structure 116 are insulating photosensitive materials, for example a photo resist. The shapes of the isolation structure 114 and the dummy isolation structure 116 may be an island, and a size of the isolation structure 114 is the same as or different from a size of the dummy isolation structure 116.

Figure 5A:
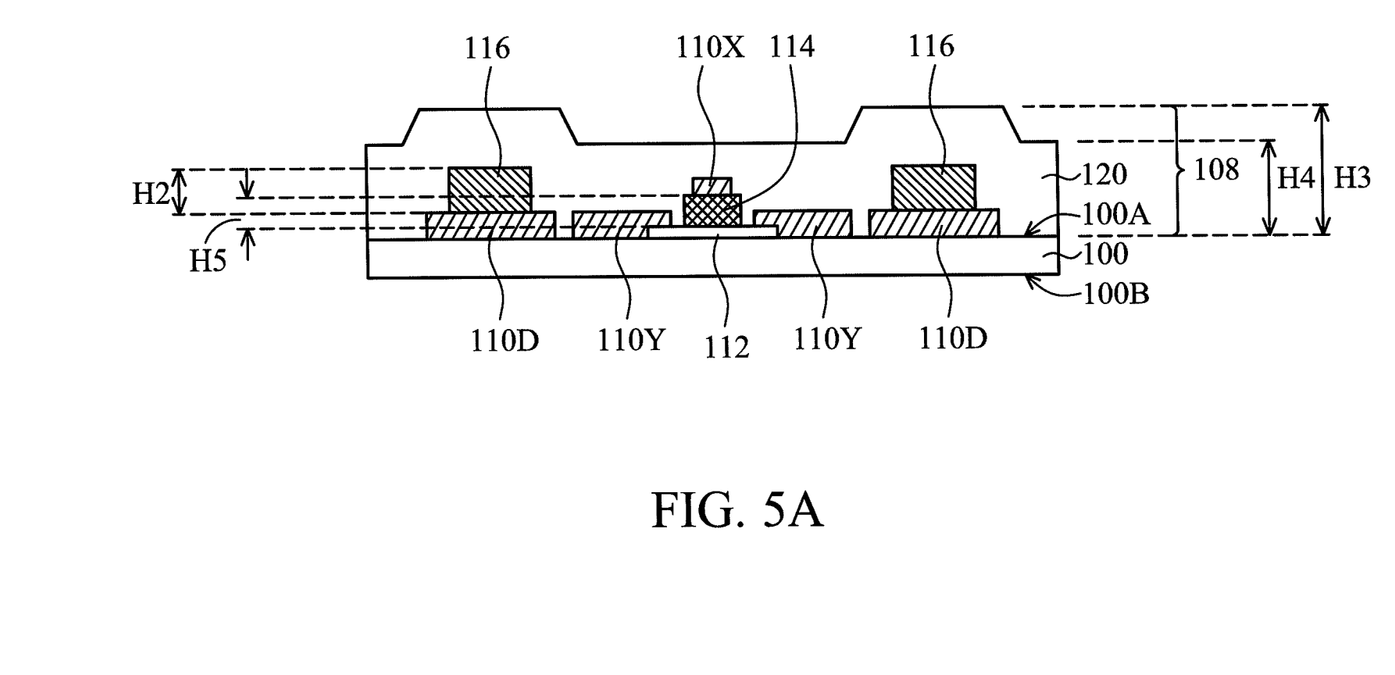
FIG. 5A shows an illustrative cross section of a touch panel along the cross section line 5-5' of FIG. 4 according to an embodiment of the invention.

FIG. 5A shows a cross section of the touch panel 108 along the cross section line 5-5' of FIG. 4 according to an embodiment of the invention. As shown in FIG. 5A, the bridge structure 112, the conductive patterns 110X, the conductive patterns 110Y and the dummy transparent conductive patterns 110D are disposed on the surface 100A of the substrate 100. The conductive patterns 110Y are electrically connected with each other by the bridge structure 112. The isolation structure 114 is disposed on the bridge structure 112 for electrically isolating the connection portion of the conductive patterns 110X from the bridge structure 112. The dummy isolation structure 116 is disposed over the dummy transparent conductive patterns 110D. A height H5 of the isolation structure 114 is lower than a height H2 of the dummy isolation structure 116. In an embodiment, the height H5 is about 50% that of the height H2.

The surface 100A of the substrate 100 is completely covered with a protective layer 120. The material of the protective layer 120 is for example acrylic resin, silicon nitride, silicon oxide or silicon oxynitride. As shown in FIG. 5A, a height H3 of a portion of the protective layer 120 over the dummy isolation structure 116 is higher than a height H4 of a portion of the protective layer 120 over the isolation structure 114. In an embodiment, a difference between the height H3 and the height H4 is about 200 nm. Therefore, scratches occurring at the location of the bridge structure 112 are effectively reduced by the structure design of the touch panel 108 of the embodiment.

Figure 5B:
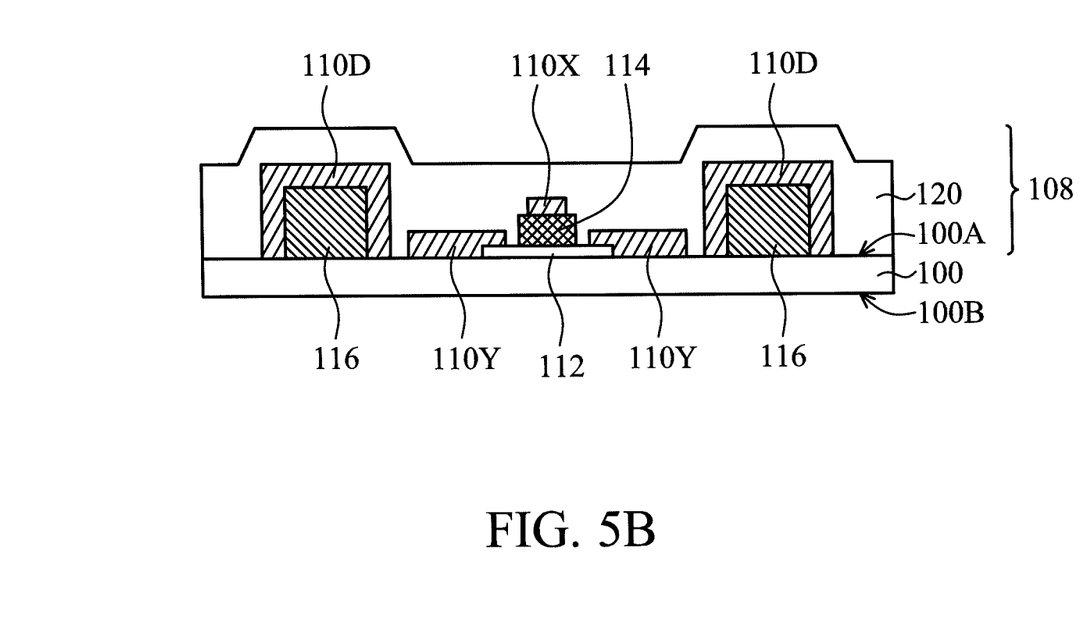
FIG. 5B shows an illustrative cross section of a touch panel along the cross section line 5-5' of FIG. 4 according to another embodiment of the invention.

FIG. 5B shows a cross section of the touch panel 108 along the cross section line 5-5' of FIG. 4 according to another embodiment of the invention. The difference between the touch panel 108 of FIG. 5B and the touch panel 108 of FIG. 5A is the dummy isolation structure 116 directly disposed on the surface 100A of the substrate 100 and the dummy transparent conductive patterns 110D disposed over the dummy isolation structure 116. Similarly, a height of the isolation structure 114 is lower than a height of the dummy isolation structure 116. Moreover, a height of a portion of the protective layer 120 over the dummy isolation structure 116 is higher than a height of a portion of the protective layer 120 over the isolation structure 114. Therefore, scratches occurring at the location of the bridge structure 112 are effectively reduced by the structure design of the touch panel 108 of FIG. 5B.

In another embodiment, no dummy transparent conductive pattern 110D is disposed between the conductive patterns 110X and the conductive patterns 110Y. Only the dummy isolation structure 116 is formed on the surface 100A of the substrate 100 and between the conductive patterns 110X and the conductive patterns 110Y.

FIGS. 6A-6D show cross sections of intermediate processes of forming the touch panel 108 of FIG. 5A according to an embodiment of the invention.

Figure 6A:
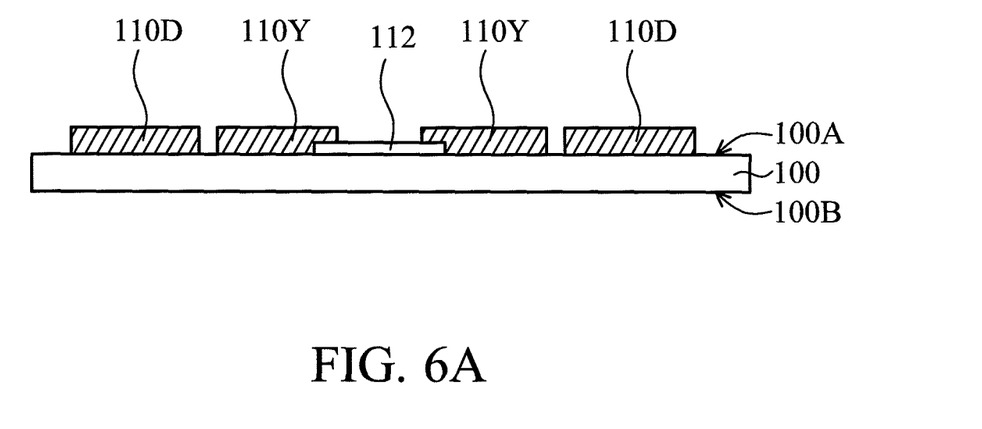
FIGS. 6A-6D show illustrative cross sections of intermediate processes of forming the touch panel of FIG. 5A according to an embodiment of the invention.

Referring to FIG. 6A, firstly, a substrate 100 is provided. The substrate 100 is an upper substrate of a display panel, for example a color filter substrate. A transparent conductive layer or a metal layer is deposited on a surface 100A of the substrate 100. Then, the transparent conductive layer or the metal layer is patterned by a photolithography and etching process to form the bridge structure 112. Next, a transparent conductive layer is deposited on the surface 100A of the substrate 100. Then, the transparent conductive layer is patterned by a photolithography and etching process to form the conductive patterns 110Y and the dummy transparent conductive patterns 110D. The conductive patterns 110Y are used for Y-direction sensing electrodes of the touch panel 108.

Figure 6B:
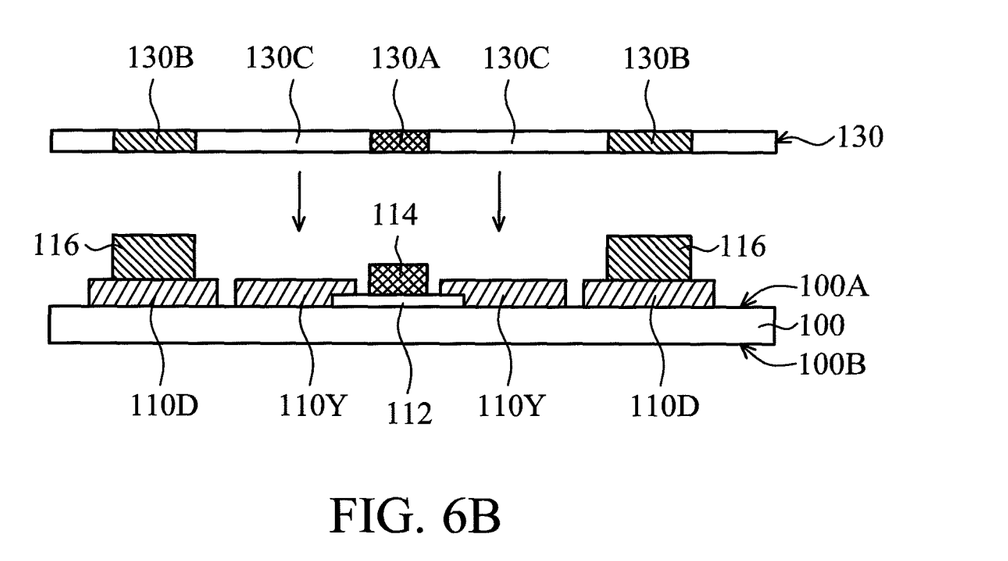

Referring to FIG. 6B, the surface 100A of the substrate 100 is completely coated with an isolation layer. Then, a halftone mask 130 is provided above the isolation layer. The halftone mask 130 may be a gray photo mask, a halftone photo mask or a photo mask with slits. The halftone mask 130 has a transparent pattern 130C, a translucent pattern 130A and an opaque pattern 130B. A patterned isolation layer is formed by using the halftone mask 130 to perform an exposure and a development process to the isolation layer. The patterned isolation layer includes the isolation structure 114 formed on the bridge structure 112 and the dummy isolation structure 116 formed on the dummy transparent conductive patterns 110D. The isolation structure 114 is corresponded to the translucent pattern 130A, the dummy isolation structure 116 is corresponded to the opaque pattern 130B and a portion of the isolation layer corresponding to the transparent pattern 130C is completely removed. Because the halftone mask 130 is used to perform the exposure and the development process to the isolation layer, the isolation structure 114 and the dummy isolation structure 116 are formed at the same time. Moreover, a height of the isolation structure 114 is lower than a height of the dummy isolation structure 116.

Figure 6C:
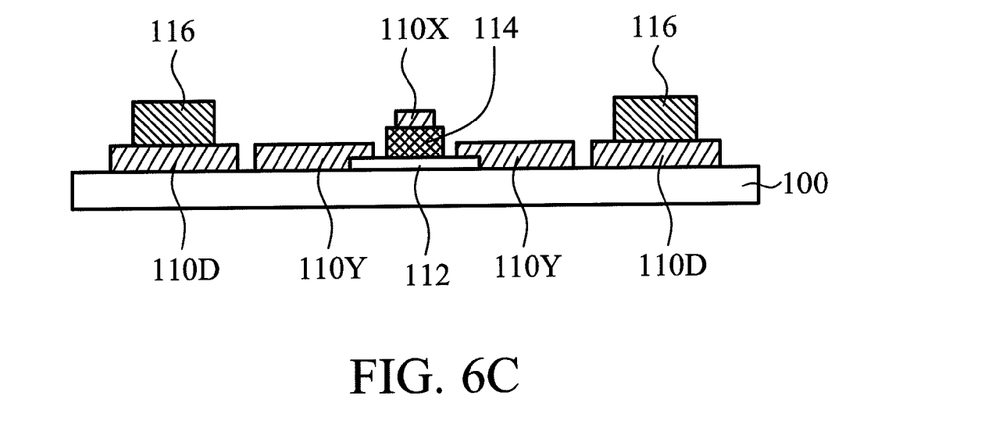

Referring to FIG. 6C, a transparent conductive layer is deposited on the surface 100A of the substrate 100. Then, the transparent conductive layer is patterned by a photolithography and etching process to form the conductive patterns 110X. The conductive patterns 110X are used for X-direction sensing electrodes of the touch panel 108.

Figure 6D:
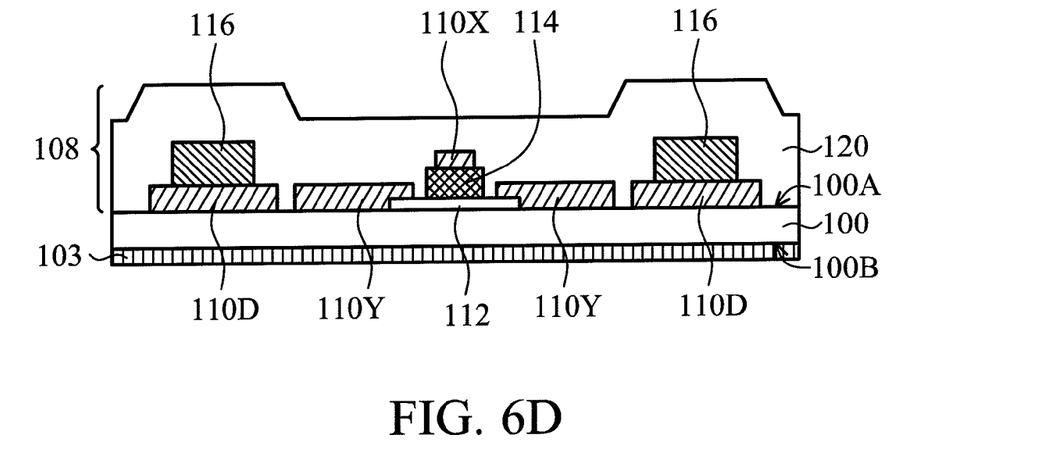

Referring to FIG. 6D, the surface 100A of the substrate 100 is completely coated with the protective layer 120 to complete the touch panel 108 as shown in FIG. 5A. A height of the isolation structure 114 disposed on the bridge structure 112 is lower than a height of the dummy isolation structure 116. Therefore, after forming the protective layer 120, a height of a portion of the protective layer 120 over the isolation structure 114 is also lower than a height of a portion of the protective layer 120 over the dummy isolation structure 116. When a color filter layer 103 or other element layer is formed on another surface 100B of the substrate 100, the structure design of the touch panel 108 can effectively prevent or reduce the portion of the touch panel 108 at the location of the bridge structure 112 from scratching. Thus, it can prevent the touch panel 108 from failing.

Then, as shown in FIG. 1, a substrate 102, for example a thin-film transistor (TFT) array substrate, is provided opposite to the surface 100B of the substrate 100. Further, a display element 104, for example a liquid crystal layer, is sandwiched between the substrate 100 and the substrate 102 to form the display panel. Moreover, a cover lens 106, for example a glass substrate or a plastic substrate, may be formed on the outside of the touch panel 108 to complete the fabrication of a touch display device 200.

FIGS. 7A-7D show cross sections of intermediate processes of forming the touch panel 108 of FIG. 5B according to an embodiment of the invention.

Figure 7A:
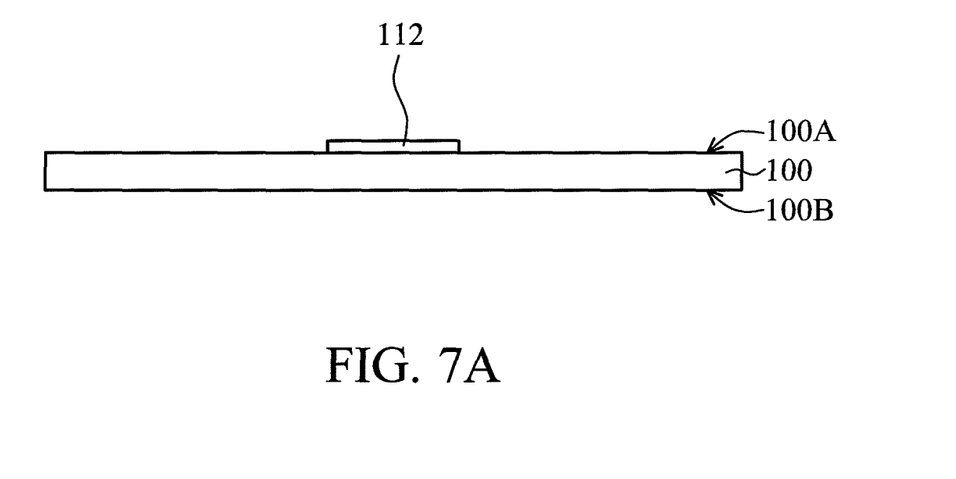
FIGS. 7A-7D show illustrative cross sections of intermediate processes of forming the touch panel of FIG. 5B according to an embodiment of the invention.

Referring to FIG. 7A, firstly, a substrate 100 is provided. The substrate 100 is an upper substrate of a display panel, for example a color filter substrate. A transparent conductive layer or a metal layer is deposited on a surface 100A of the substrate 100. Then, the transparent conductive layer or the metal layer is patterned by a photolithography and etching process to form the bridge structure 112.

Figure 7B:
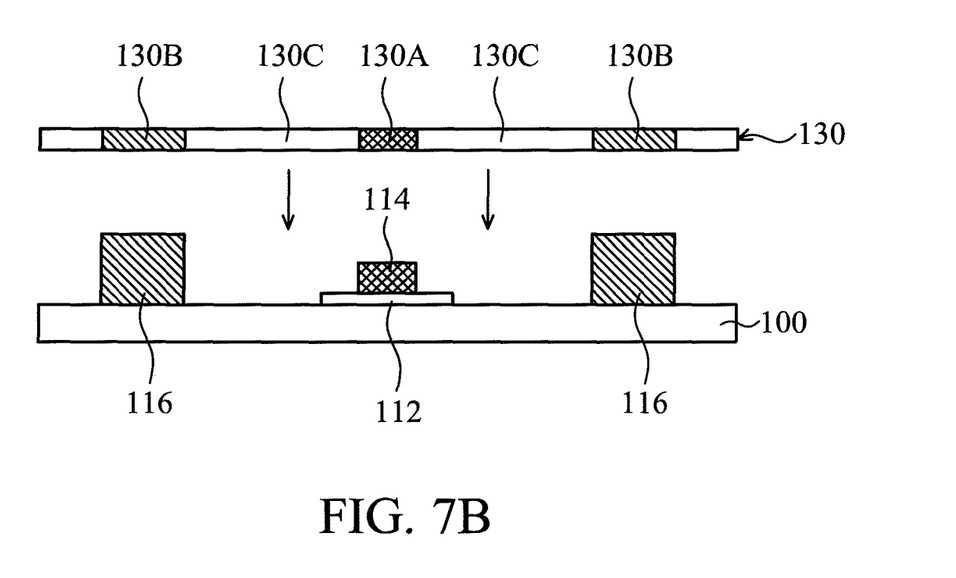

Referring to FIG. 7B, the surface 100A of the substrate 100 is completely coated with an isolation layer. Then, a halftone mask 130 is provided above the isolation layer. The halftone mask 130 may be a gray photo mask, a halftone photo mask or a photo mask with slits. The halftone mask 130 has a transparent pattern 130C, a translucent pattern 130A and an opaque pattern 130B. A patterned isolation layer is formed by using the halftone mask 130 to perform an exposure and a development process to the isolation layer. The patterned isolation layer includes the isolation structure 114 formed on the bridge structure 112 and the dummy isolation structure 116 formed on the surface 100A of the substrate 100. As shown in FIG. 4, the dummy isolation structure 116 is disposed between the conductive patterns 110X and the conductive patterns 110Y. The isolation structure 114 is corresponded to the translucent pattern 130A and the dummy isolation structure 116 is corresponded to the opaque pattern 130B. Because the halftone mask 130 is used to perform the exposure and the development process to the isolation layer, the isolation structure 114 and the dummy isolation structure 116 are formed at the same time. Moreover, a height of the isolation structure 114 is lower than a height of the dummy isolation structure 116.

Figure 7C:
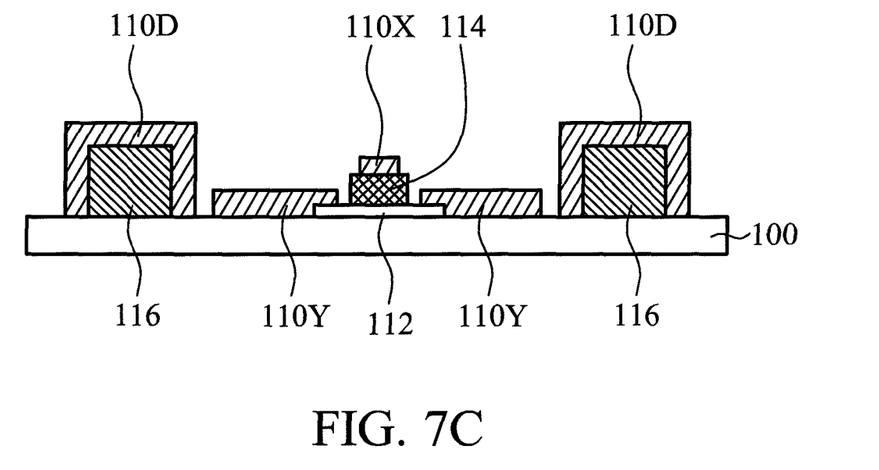

Referring to FIG. 7C, a transparent conductive layer is deposited on the surface 100A of the substrate 100. Then, the transparent conductive layer is patterned by a photolithography and etching process to form the conductive patterns 110Y, the conductive patterns 110X and the dummy transparent conductive patterns 110D at the same time. The conductive patterns 110Y are separated from each other and electrically connected by the bridge structure 112. The conductive patterns 110Y are used for Y-direction sensing electrodes of the touch panel 108. The conductive patterns 110X are directly connected with each other, which are used for X-direction sensing electrodes of the touch panel 108. The dummy transparent conductive pattern 110D is formed on the dummy isolation structure 116 and disposed between the conductive pattern 110X and the conductive pattern 110Y as shown in FIG. 4. The dummy transparent conductive pattern 110D is also isolated from conductive pattern 110X and the conductive pattern 110Y.

Figure 7D:
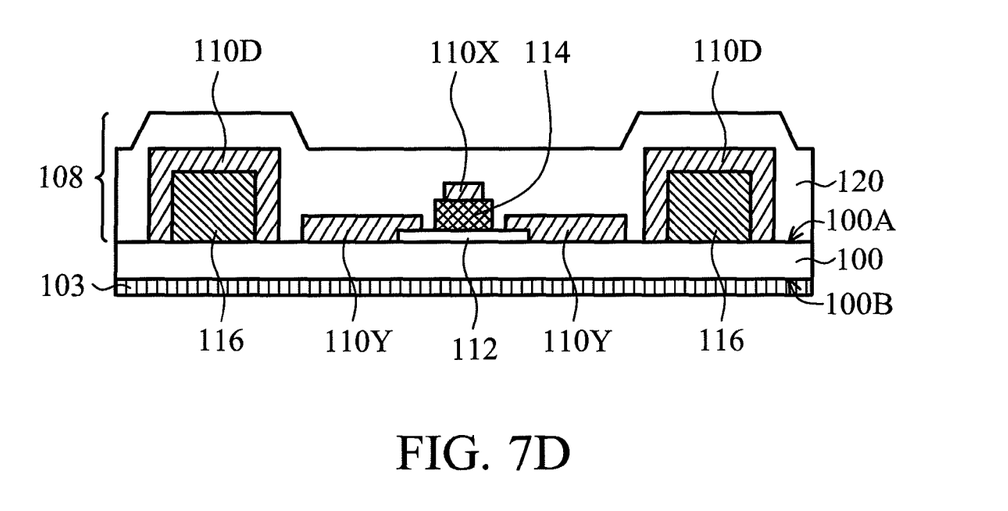

Referring to FIG. 7D, the surface 100A of the substrate 100 is completely coated with the protective layer 120 to complete the touch panel 108 as shown in FIG. 5B. A height of the isolation structure 114 disposed on the bridge structure 112 is lower than a height of the dummy isolation structure 116. Therefore, after forming the conductive patterns 110Y, the conductive patterns 110X, the dummy transparent conductive patterns 110D and the protective layer 120, a height of a portion of the protective layer 120 at the location of the bridge structure 112 is also lower than a height of a portion of the protective layer 120 over the dummy isolation structure 116. When a color filter layer 103 or other element layer is formed on another surface 100B of the substrate 100, the structure design of the touch panel 108 can effectively prevent or reduce the portion of the touch panel 108 at the location of the bridge structure 112 from scratching or crushing. Thus, it can prevent the touch panel 108 from failing.

Then, as shown in FIG. 1, a substrate 102, for example a thin-film transistor (TFT) array substrate, is provided opposite to the surface 100B of the substrate 100. Furthermore, a display element 104, for example a liquid crystal layer, is sandwiched between the substrate 100 and the substrate 102 to form the display panel. Moreover, a cover lens 106, for example a glass substrate or a plastic substrate, may be formed on the outside of the touch panel 108 to complete the fabrication of a touch display device 200.

In summary, the touch display devices of the embodiments are fabricated by forming a touch panel on a backside of an upper substrate of a display panel. Therefore, one glass substrate is omitted from the touch display device and a total thickness of the touch display device is decreased. Moreover, in the embodiments of the invention, a structure design of a dummy isolation structure is used in the touch panel to make a highest portion of the touch panel to be located on the dummy isolation structure. Thus, when a dual-side process is performed on the upper substrate of the display panel, the structure design of the dummy isolation structure can effectively prevent or reduce the intersection of two-direction sensing electrodes of the touch panel from scratching or crushing. Further, it can prevent the touch panels from failing and enhance the fabrication yield of the touch display devices.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch display device, comprising:
    a display panel, comprising:
        a first substrate, having a first surface and an opposite second surface; and
        a color filter layer disposed on the second surface of the first substrate; and
    a touch panel disposed on the first surface of the first substrate, comprising:
        a plurality of first conductive patterns arranged along a first direction and disposed on the first surface of the first substrate;
        a plurality of second conductive patterns arranged along a second direction perpendicular to the first direction and disposed on the first surface of the first substrate; and
        a patterned isolation layer, having a first portion and a second portion, wherein the first portion is disposed at an intersection of the first conductive patterns and the second conductive patterns, the second portion is disposed between the first conductive patterns and the second conductive patterns, and the first portion has a top surface that is lower than a top surface of the second portion.

2. The touch display device of claim 1, wherein the touch panel further comprises a bridge structure disposed on the first surface of the first substrate for electrically connecting the first conductive patterns with each other.

3. The touch display device of claim 2, wherein the material of the bridge structure comprises a transparent conductive material or a metal material.

4. The touch display device of claim 1, wherein the touch panel further comprises a dummy transparent conductive pattern disposed on the first surface of the first substrate and between the first conductive patterns and the second conductive patterns, and wherein the dummy transparent conductive pattern is further disposed under the second portion of the patterned isolation layer.

5. The touch display device of claim 1, wherein the touch panel further comprises a dummy transparent conductive pattern disposed on the first surface of the first substrate and between the first conductive patterns and the second conductive patterns, and wherein the dummy transparent conductive pattern is further disposed over the second portion of the patterned isolation layer.

6. The touch display device of claim 1, wherein the touch panel further comprises a protective layer to completely cover the first surface of the first substrate, and wherein a portion of the protective layer over the first portion of the patterned isolation layer has a height that is lower than a height of a portion of the protective layer over the second portion of the patterned isolation layer.

7. The touch display device of claim 1, wherein the material of the patterned isolation layer comprises an insulating photosensitive material.

8. The touch display device of claim 1, wherein the shapes of the first portion and the second portion of the patterned isolation layer comprise an island and the second portion of the patterned isolation layer comprises a plurality of islands.

9. The touch display device of claim 1, wherein the materials of the first conductive patterns and the second conductive patterns comprise a transparent conductive material.

10. The touch display device of claim 1, wherein the display panel further comprises a second substrate disposed opposite to the second surface of the first substrate and a display element sandwiched between the first substrate and the second substrate.

11. A method of forming a touch display device, comprising:
    providing a first substrate, having a first surface and an opposite second surface; and
    forming a touch panel on the first surface of the first substrate, wherein the steps of forming the touch panel comprise:
        forming a plurality of first conductive patterns on the first surface of the first substrate, arranged along a first direction;
        forming a plurality of second conductive patterns on the first surface of the first substrate, arranged along a second direction perpendicular to the first direction;
        coating an isolation layer over the first surface of the first substrate; and
        forming a patterned isolation layer by an exposure and a development process, wherein the patterned isolation layer includes a first portion and a second portion, the first portion is formed at an intersection of the first conductive patterns and the second conductive patterns, the second portion is formed between the first conductive patterns and the second conductive patterns, and the first portion has a top surface that is lower than a top surface of the second portion.

12. The method of claim 11, wherein the steps of forming the touch panel further comprises forming a bridge structure for electrically connecting the first conductive patterns with each other.

13. The method of claim 11, wherein the steps of forming the touch panel further comprises forming a dummy transparent conductive pattern on the first surface of the first substrate and between the first conductive patterns and the second conductive patterns.

14. The method of claim 13, wherein the first conductive patterns and the second conductive patterns are formed respectively, the dummy transparent conductive pattern and the first conductive patterns are formed simultaneously, and the second portion of the patterned isolation layer is formed over the dummy transparent conductive pattern.

15. The method of claim 13, wherein the first conductive patterns, the second conductive patterns and the dummy transparent conductive pattern are formed simultaneously, and the dummy transparent conductive pattern is formed over the second portion of the patterned isolation layer.

16. The method of claim 11, wherein the exposure and a development process comprise using a halftone mask, the halftone mask has a transparent pattern, an opaque pattern and a translucent pattern, the translucent pattern is corresponded to the first portion of the patterned isolation layer, and the opaque pattern is corresponded to the second portion of the patterned isolation layer.

17. The method of claim 16, wherein the halftone mask comprises a gray photo mask, a halftone photo mask or a photo mask with slits.

18. The method of claim 11, wherein the steps of forming the touch panel further comprises forming a protective layer to completely cover the first surface of the first substrate, and wherein a portion of the protective layer over the first portion of the patterned isolation layer has a height that is lower than a height of a portion of the protective layer over the second portion of the patterned isolation layer.

19. The method of claim 11, after forming the touch panel, further comprising:

forming a color filter layer on the second surface of the first substrate;
providing a second substrate to face the second surface of the first substrate; and
forming a display element to be sandwiched between the first substrate and the second substrate.

\* \* \* \* \*